April 24, 1951          A. RAPPL          2,550,021
POWER LINE SUPPORT FOR MOTOR VEHICLE DOORS
Filed June 5, 1946
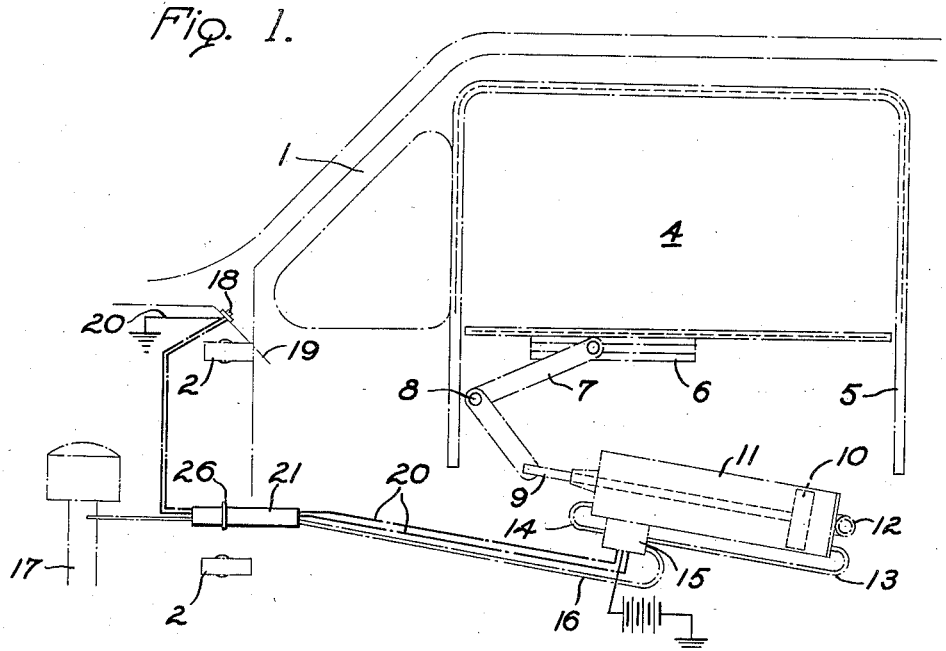
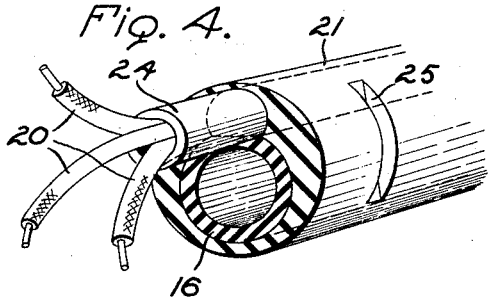
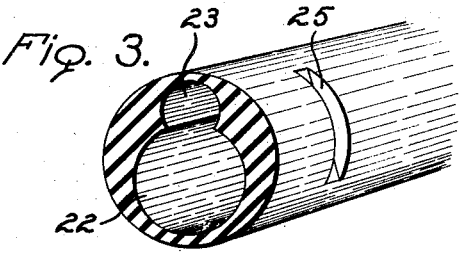
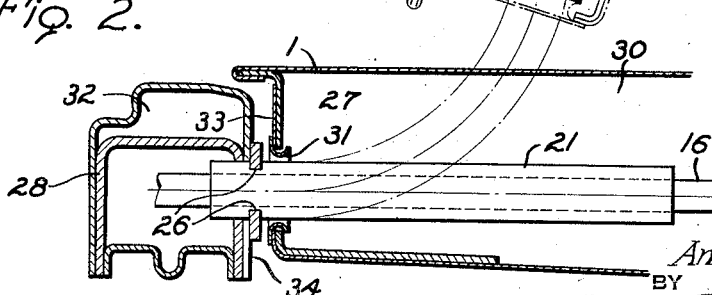
INVENTOR
*Anton Rappl*
BY
*Beau, Brooks, Buckley & Beau.*
ATTORNEYS Patented Apr. 24, 1951

2,550,021

UNITED STATES PATENT OFFICE 2,550,021

POWER LINE SUPPORT FOR MOTOR VEHICLE DOORS

Anton Rappl, Eggertsville, N. Y., assignor to Trico Products Corporation, Buffalo, N. Y.

Application June 5, 1946, Serial No. 674,516

6 Claims. (Cl. 296—44)

This invention relates to the window operating art and particularly to the installation of a window operator on a motor vehicle wherein the doors are provided with windows which necessitate the power line being carried across the hinge axis for the door mounting.

Previous arrangements have been devised to facilitate the carrying of the power line across the hinge mounting to the motor or power unit of the window operator which is usually located in the window well formed in the door. Certain of these constructions have necessitated supporting brackets of preformed design curved to accommodate the swinging movement of the door upon its hinges.

The primary object of the invention is to provide a power line cross-over support which is simple and durable in design and one which is economical to produce.

More particularly, the invention resides in an improved cross-over support which may be formed from straight tubular stock from which predetermined lengths may be severed to produce the supports without the necessity of any pre-shaping.

A further object of the present invention is to provide a power line support having a flexibility which will accommodate the swinging door movement in a practical manner.

These and other objects will manifest themselves as the decription progresses, reference being had to the accompanying drawing, wherein:

Fig. 1 is a diagrammatic or phantom view illustrating the present invention as applied to an operating arrangement for a side window in the door of a motor vehicle;

Fig. 2 is a fragmentary horizontal section through the door more clearly depicting the operation of the present invention;

Fig. 3 is a transverse section of the cross-over support;

Fig. 4 is a similar view showing the power lines installed in the support; and

Fig. 5 is a detailed view of the tube supporting plate.

Referring more particularly to the drawing, the numeral 1 designates a side door of a motor vehicle which is mounted on the door frame by the concealed hinges 2 for swinging about an axis indicated at 3 to and from an open position depicted by the broken lines 1'. The window 4 is slidably mounted in vertical guideways 5 on the door and carries on its bottom edge a guide plate 6 in which one end of a bell crank lever 7 has sliding engagement, the bell crank lever being fulcrumed at 8 and having its opposite end connected to a reciprocating rod 9. The motor, herein depicted as being fluid actuated, has its piston 10 connected to this rod 9 and operates within a chamber 11 pivotally mounted at 12. Branch passages 13 and 14 connect the opposite ends of the chamber to a master control valve 15 which in turn is connected by a conduit 16 to a source of supply, such as the intake manifold 17 of the motor vehicle engine. The master valve 15 may be placed under the control of a switch 18 on the instrument panel 19. By manipulating the switch the motor may be selectively actuated to either open or close the window 4. Such an arrangement is shown more clearly in Patent No. 2,439,863.

Since the motor is door carried the suction supply conduit 16 and the electric circuit wires 20 must therefore be carried across the hinge mounting for the door. To this end there is provided a power line support 21 in the form of a flexible rubber tube having a multi-chambered bore therethrough with a larger bore 22 communicating with a smaller bore 23. The smaller bore 23 provides a seat for receiving the electric circuit wires 20 and their enveloping sheathing 24, while the larger bore 22 provides a seat for the suction conduit 16, the arrangement being such that the sheathed circuit wires will be preliminarily inserted in the channeled seat 23 and thereafter locked therein by and upon placement of the suction conduit 16 within its channeled seat 22. This nested or interlocked relationship is shown more clearly in Fig. 4 wherein it will be noted that the sheath 24 may be preliminarily introduced into the larger bore 22 and thereafter moved laterally or radially into its seat 23 where it will be retained by and upon axial placement of the conduit 16 in its seat 22.

The rubber tube 21 interlocked or anchored at one end to one body part of the vehicle as by having a pair of chordal notches or grooves 25 preferably located for receiving the parallel margins 26 of a slot formed in the mounting bracket plate 27 which latter is attached to the door post 28 by fasteners 29. The notches 25 are arranged adjacent one end of the power line mounting tube so as to dispose the major length of the tube within the door for extending into the door well or chamber 30 through an eye 31, the eye being rounded to present a smooth surface on which the tube may slidably play in and out when the door is closed and opened. From Fig. 2 it will be observed that the tube and its self-contained power lines will flex during such door movement while still maintaining a closed and protected communication between the chamber 30 in the door and the chamber 32 in the door post 28 and across the hinge mounting. The tube extends through openings in the opposed walls 33 and 34 of the door and post elements of the vehicle body for lateral flexing. The flexed tube will assume its straight position when the door is closed due to its inherent resiliency and consequently urges the door to its closed position. Preferably the bottom walls of the notches 25 extend parallel to the hinge axis so that the bending of the tube will be facilitated against excessive wear and tear at the point of anchorage.

The tube shields and protects the enclosed power lines while extending across the large gap between the opposed walls 33 and 34 when the door is open. For this reason the tube has a solid wall formation, but obviously the power line support could be open more or less along one side, such as to its under side, to give it a channeled design, which is comprehended within the use of the term "tube" or "tubular" in the appended claims. In mounting the tube the latter is collapsed to introduce the notched end thereof in the opening of the mounting plate 27 and thereafter expanded for receiving the opposed margins or edge portions 26 where the anchoring interlock is secured thereafter by and upon placement of the power lines within the tube.

From the foregoing it will be observed that the power line support or tube is firmly anchored at one end, preferably in the door post 28 from which point of anchorage the longer portion of the tube extends freely into the cooperating door structure for playing in and out as the door moves from and to a closed position, the tube readily bending by reason of its resiliency when displaced by the door movement. The power lines, including the duct 16 and the sheathing 24 which also are of flexible material, will readily follow the curvature of their supporting tube as the latter bends to and from its normal position. The cross-over support is economical of manufacture since it may be formed from tubular hose having the predetermined bore design, the hose being severed into lengths suitable for the hinge movement of the door.

The foregoing description has been given in detail for ease of understanding the inventive teaching and principles involved, which latter may be incorporated in other physical embodiments without departing from the spirit of the invention and the scope of the appended claims.

What is claimed is:

1. A motor vehicle having a door frame with a chambered post, a chambered door hinged to the post, said chambered parts having opposed faces each formed with an opening leading into the respective chamber, a tubular power line support arranged in the two openings of the opposed faces and having its opposite ends opening into the two chambers for carrying the power line of an automotive accessory across the hinge mounting of the door, said tubular support being in the form of a flexible rubber tube having oppositely opening laterally disposed seats and being collapsible to introduce the tube in one part opening and thereafter to engage the opposed marginal portions of such opening for anchoring the support to the respective chambered part, and power line means passing through the tube to give sustaining support thereto against seat-disengaging collapse thereof.

2. A motor vehicle having a door frame with a chambered post, a chambered door hinged to the post, said chambered parts having opposed faces each formed with an opening leading into the respective chamber, and a tubular power line support arranged in the two openings of the opposed faces and having its opposite ends opening into the two chambers for carrying an enclosed power line of an automotive accessory across the hinge mounting of the door, the face opening of one chambered part having opposed edge portions extending substantially parallel to the hinge axis, said tubular support having lateral peripheral notches on one end for receiving the opposed edge portions for being anchored to said body part while leaving the opposite end of the support free to slide in and out of the opening of the companion part during swinging movement of the door, said one end of the tubular support being collapsible to enable engagement of the notches with the edge portions, and said enclosed power line supporting the tubular support against collapse.

3. A motor vehicle having a door frame with a chambered post, a chambered door hinged to the post, said chambered parts having opposed faces each formed with an opening leading into the respective chamber, and a normally straight but laterally flexible power line support arranged in the two openings of the opposed faces and anchored at one end in a face opening with its opposite end freely slidable through the other face opening for being flexed by the door when opening the same, said support having a pair of opposed channel seats extending lengthwise therethrough and having open communication with each other throughout the length of the support through an entranceway from one channel seat to the other for enabling placement of a power line in one seat from the companion seat for thereafter being locked therein by and upon placement of a second power line in said companion seat.

4. A support for carrying a power line from a door frame part to a door part hingedly mounted on the frame, comprising a resilient tube having its opposite ends adapted for being received in openings formed in opposing portions of said parts, said tube having an anchoring end portion collapsible against its resiliency for inserting in one opening in one part, the periphery of such anchoring end portion having shoulder means for interlocking with the opening defining edge of said part upon release of the tube collapsing pressure, and a power line element inserted in the tube for holding the latter expanded and thereby maintaining the interlock, the opposite end portion of the tube being free to flex with the power line when the door is opened.

5. A support for a power line, comprising a tube having a longitudinal opening therethrough shaped in cross section to provide a large seat and an opposing relatively smaller seat, the latter seat opening into the former seat through a lateral entranceway which is narrower than the larger seat for enabling initial placement of a smaller power line laterally into such smaller seat and subsequent axial placement of a larger power line in the larger seat, in combination with the two power lines which substantially so fit their seats.

6. A support for carrying a power line, comprising a tube having an opening therethrough shaped in cross section to provide a large seat and an opposing relatively smaller seat communicating laterally with one another through a longitudinally extending entranceway, a power line displaceable laterally from the relatively smaller seat, and a relatively larger power line inserted axially in the larger seat in supporting contact with the first power line for holding the same in place.

ANTON RAPPL.

REFERENCES CITED

The following references are of record in the file of this patent:

UNITED STATES PATENTS

| Number | Name | Date |
|---|---|---|
| 646,886 | Stowe et al. | Apr. 3, 1900 |
| 805,570 | Maldaner | Nov. 28, 1905 |
| 1,990,624 | Waddey | Feb. 12, 1935 |
| 2,115,811 | Hansen | May 3, 1938 |
| 2,124,037 | Lavigne | July 19, 1938 |
| 2,240,768 | Gill | May 6, 1941 |
| 2,286,462 | Chaffin | June 16, 1942 |
| 2,311,427 | Winkelmeyer | Feb. 16, 1943 |
| 2,335,696 | Rappl et al. | Nov. 30, 1943 |
| 2,416,118 | Parsons | Feb. 18, 1947 |
| 2,425,823 | Parsons | Aug. 19, 1947 |

FOREIGN PATENTS

| Number | Country | Date |
|---|---|---|
| 790,740 | France | Sept. 16, 1935 |